United States Patent
Li et al.

(10) Patent No.: US 11,326,579 B2
(45) Date of Patent: May 10, 2022

(54) ADAPTIVE DYNAMIC PLANNING CONTROL METHOD AND SYSTEM FOR ENERGY STORAGE STATION, AND STORAGE MEDIUM

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Xiangjun Li, Beijing (CN); Yuting He, Beijing (CN); Jingqiong Zhang, Beijing (CN); Dong Hui, Beijing (CN); Xuecui Jia, Beijing (CN)

(73) Assignees: China Electric Power Research Institute Company Limited, Beijing (CN); State Grid Corporation of China, Beijing (CN)

( * ) Notice: Subject to any disclaimer, the term of this patent is extended or adjusted under 35 U.S.C. 154(b) by 837 days.

(21) Appl. No.: 16/095,844

(22) PCT Filed: Apr. 28, 2017

(86) PCT No.: PCT/CN2017/082564
§ 371 (c)(1),
(2) Date: Oct. 23, 2018

(87) PCT Pub. No.: WO2017/186178
PCT Pub. Date: Nov. 2, 2017

(65) Prior Publication Data
US 2020/0191117 A1 Jun. 18, 2020

(30) Foreign Application Priority Data
Apr. 28, 2016 (CN) .......................... 201610278732.6

(51) Int. Cl.
*F03D 7/04* (2006.01)
*H02J 3/32* (2006.01)
(Continued)

(52) U.S. Cl.
CPC ................ *F03D 7/046* (2013.01); *F03D 9/11* (2016.05); *F03D 9/255* (2017.02); *G05B 13/042* (2013.01);
(Continued)

(58) Field of Classification Search
CPC .. F03D 7/046; F03D 9/11; F03D 9/255; H02J 7/0048; H02J 7/00712; H02J 3/32;
(Continued)

(56) References Cited

U.S. PATENT DOCUMENTS

2003/0015876 A1   1/2003   Ichinose
2011/0089693 A1*  4/2011   Nasiri ................. F03D 7/046
                                                            290/44

(Continued)

FOREIGN PATENT DOCUMENTS

CN   102738817 A   10/2012
CN   103248065 A    8/2013
(Continued)

OTHER PUBLICATIONS

International Search Report in international application No. PCT/CN2017/082564, dated Jul. 28, 2017.
(Continued)

*Primary Examiner* — Charles R Kasenge
(74) *Attorney, Agent, or Firm* — ArentFox Schiff LLP; Michael Fainberg (57) ABSTRACT

An adaptive dynamic planning control method and system for a large-scale energy storage station. The method comprises: setting a structure and control target parameters of an adaptive dynamic planning control system; initializing the
(Continued)

parameters and importing an initial state of a controlled object; calculating an original wind electricity power fluctuation rate at a current moment t and smoothing the original wind electricity power according to a change rate control strategy; calculating a smoothed wind storage power fluctuation rate, a power of an energy storage system, and a state of charge (SOC) of the energy storage system; initializing and training an evaluation module and an execution module; calculating and saving a control strategy, a smoothed wind storage power fluctuation rate, an energy storage power and a (SOC) at each moment; and outputting the control strategy at each moment, the smoothed wind storage power fluctuation rate, the energy storage power and the (SOC).

19 Claims, 2 Drawing Sheets

(51) Int. Cl.
    *H02J 3/38* (2006.01)
    *G05B 13/04* (2006.01)
    *F03D 9/11* (2016.01)
    *F03D 9/25* (2016.01)
    *H02J 7/32* (2006.01)
    *H02J 7/00* (2006.01)
    *G06N 3/04* (2006.01)
    *G06N 3/08* (2006.01)

(52) U.S. Cl.
    CPC ............ *G06N 3/04* (2013.01); *G06N 3/08* (2013.01); *H02J 3/32* (2013.01); *H02J 3/381* (2013.01); *H02J 7/0048* (2020.01); *H02J 7/00712* (2020.01); *H02J 7/32* (2013.01); *F05B 2270/1033* (2013.01); *F05B 2270/404* (2013.01); *H02J 2203/20* (2020.01); *H02J 2300/28* (2020.01)

(58) Field of Classification Search
    CPC .......... H02J 3/381; H02J 7/32; H02J 2300/28; H02J 2203/20; H02J 3/004; H02J 3/00; H02J 3/28; H02J 3/386; G05B 13/042; G06N 3/04; G06N 3/08; G06N 3/006; F05B 2270/1033; F05B 2270/404; F05B 2270/709; F05B 2270/322; Y02E 40/70; Y02E 70/30; Y02E 10/72; Y02E 10/76; Y04S 10/50

See application file for complete search history.

(56) References Cited

U.S. PATENT DOCUMENTS

| 2015/0019034 | A1* | 1/2015 | Gonatas | .................. H02S 40/38 700/291 |
|---|---|---|---|---|
| 2016/0233679 | A1 | 8/2016 | Li et al. | |

FOREIGN PATENT DOCUMENTS

| CN | 103560533 A | 2/2014 |
|---|---|---|
| CN | 103956758 A | 7/2014 |
| CN | 104022503 A | 9/2014 |
| CN | 104283224 A | 1/2015 |
| CN | 105846461 A | 8/2016 |
| EP | 1022838 A2 | 7/2000 |
| EP | 2757650 A1 | 7/2014 |
| WO | 2015054878 A1 | 4/2015 |

OTHER PUBLICATIONS

English Translation of the Written Opinion of the International Search Authority in international application No. PCT/CN2017/082564, dated Jul. 28, 2017.
Li, Xiangjun et al., "Optimal Control Method of Energy Storage System Based on Adaptive Dynamic Programming", Power System Technology, May 31, 2016.
Adaptive Critic Design-Based Dynamic Stochastic Optimal Control Design for a Microgrid With Multiple Renewable Resources, Junbiao Han et al., Aug. 3, 2015, p. 2695, col. 1.-p. 2700, col. 1.
Battery Energy Storage Station (BESS)-Based Smoothing Control of Photovoltaic (PV) and Wind Power Generation Fluctuations, X. Li et al, Mar. 7, 2013, p. 464, col. 1.-p. 470, col. 1.
A Real-time Smoothing Control Strategy With SOC Adjustment Function of Storage Systems, Ding Ming et al, Jan. 5, 2013, pp. 23 to 27.
Modeling of BESS for Smoothing Renewable Energy Output Fluctuations, Ding Ming et al, Jan. 25, 2011, full text.

* cited by examiner

ADAPTIVE DYNAMIC PLANNING CONTROL METHOD AND SYSTEM FOR ENERGY STORAGE STATION, AND STORAGE MEDIUM

CROSS-REFERENCE TO RELATED APPLICATIONS

The present application is the U.S. National Stage Application of International Patent Application No. PCT/CN2017/082564, filed on Apr. 28, 2017, which claims benefit of Chinese Patent Application No. 201610278732.6, filed on Apr. 28, 2016. The contents of each of these applications the application are hereby incorporated by reference in their its entirety.

The present application is based on, and claims priority to, Chinese Patent Application No. 201610278732.6, filed on Apr. 28, 2016, the contents of which are hereby incorporated by reference in its entirety.

TECHNICAL FIELD

The present disclosure relates to a smart grid, an Internet of energy sources, and energy storage, and in particular to a method, system, and storage medium for Adaptive Dynamic Programming (ADP) control by a power station for large-scale energy storage.

BACKGROUND

With constant development of wind power generation and photovoltaic power generation, as well as large-scale incorporation of new energy power generation (such as the wind power generation, the photovoltaic power generation, etc.) into a grid, a growing concern is fluctuation (or turbulence) of power output thereof. With large-scale incorporation of the new energy power generation, such as the wind power generation, the photovoltaic power generation, etc., into the grid, volatility and intermittence associated therewith may impact safety and stability of grid operation, quality of electric power, etc. Therefore, incorporation of the wind power generation and the photovoltaic power generation is quite limited in actual application at present, which is against the development of the new energy power generation, such as the wind power generation, the photovoltaic power generation, etc. It is vital to control the turbulence of the power output of the new energy power generation for safe, stable, economical operation of the grid. Impact of the turbulence of the power output of the new energy power generation on the grid may be effectively suppressed by charging and discharging a system for energy storage, thereby lowering volatility caused by a system for new energy power generation, improving capacity of the grid in accommodating the new energy power generation.

There may be different forms of energy storage, such as physical energy storage, electrochemical energy storage, electromagnetic energy storage, etc. Among them, energy storage by battery is experiencing a fast growth, with a power station for energy storage of up to one MegaWatt (MW) or even tens of MWs. Therefore, power generated using the new energy may be smoothed by equipping a system for large-scale energy storage by battery of certain capacity, and optimizing charging and discharging of the system for energy storage by battery according to the power output of the new energy power generation. In addition, overall optimization may be performed according to an index such as a rate of turbulence of the power output of the new energy power generation, a State Of Charge (SOC) of the system for energy storage, etc., to meet a demand for incorporating the new energy power generation, such as the wind power generation, the photovoltaic power generation, etc., into the grid.

Up to now, multiple bases for the new energy power generation of tens of millions of KiloWatts (KW) have been built in China. A grid in an area reach in the new energy power generation may generally demand energy storage by battery of capacity of at least tens of MWs or even hundreds of MWs. It is vital to include a power station for energy storage by battery of hundreds of MWs in cluster control as well as system scheduling and operation for the new energy power generation in order to break through a bottleneck in delivery and absorption of the new energy power generation. Large-scale energy storage is a key technology for supporting use of renewable energy power generation in China. To incorporate the renewable energy power generation into the grid on a large scale, randomness thereof may be reduced and adjustability thereof may be improved by combining the energy storage with the renewable energy power generation. Adaptability of the grid to the renewable energy power generation may be improved by applying grid-level energy storage. At present, energy storage, as a schedulable resource of the grid, is of great value and widely applicable.

In grid-level application, energy storage may have to support power on multiple time scales, such as from seconds to hours. To incorporate both the energy storage and the new energy power generation into the grid. Overall, a power station for energy storage by battery of hundreds of MWs may have to respond to the new energy power generation on different time scales, such as from seconds to minutes. There is a pressing need for implementing multi-objective coordinated optimization of overall power output of a power station for energy storage by battery of hundreds of MWs as needed, such as according to the turbulence of the power output of large-scale new energy power generation, grid-level application of energy storage, etc.

A power station for large-scale energy storage by battery may smooth the turbulence of the power output of large-scale new energy power generation using a conventional first-order low-pass filter or by filtering the power output with a variable time constant (T). A delay inherent to the method may sometimes lead to insensitive control. A target or objective power output of energy storage output by a common mobile average filtering algorithm may be limited largely by input power generated using the new energy, such as the wind power, the photovoltaic power, etc. With such an existing method, filtering performance may decrease in response to sudden change in the power output of the new energy power generation, impacting a subsequent filtering result. Moreover, in controlling the power output of a power station for energy storage of improved friendliness to the new energy power generation, a conventional method leaves much space for improving capability of smart optimization based on self-study in terms of adaptive control of the overall power output of the power station for energy storage.

SUMMARY

Embodiments herein provide a method, system, and storage medium for ADP control by a power station for large-scale energy storage, capable of reducing impact of incorporation of wind power on a grid and optimizing protection of capability to work and life of a system for energy storage to improve technical and economic performance of the system for energy storage.

A technical solution herein may be implemented as follows.

A method for Adaptive Dynamic Programming (ADP) control by a power station for large-scale energy storage includes:

setting an objective control parameter and a structure of a system for ADP control;

performing parameter initialization, and importing an initialized parameter as an initial state of a controlled object;

for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;

performing initialization for training an estimation module and a management module;

for each time point, computing and storing a control strategy, the rate of turbulence of the wind and energy storage hybrid power smoothed, power of energy storage, and the SOC of the system for energy storage; and outputting the rate of turbulence of the wind and energy storage hybrid power smoothed, the power of energy storage, the SOC of the system for energy storage, and the control strategy for the each time point.

The system for ADP control may include a two-layer structure of the estimation module and the management module.

Each of the estimation module and the management module may be built with a three-layer structure of a neural network.

The objective control parameter may include a capacity of wind power generation $P_{wp}^{rated}$, a capacity $W_{bat}$ of the system for energy storage, a limiting range of the SOC of the system for energy storage, a sampling interval $\Delta t$, an observation time T, an objective rate of turbulence $r_{obj}^T$, and a limiting rate of turbulence $r_{lim}^T$.

The initialized parameter may include an initial rate of turbulence of wind power, an initial SOC of the system for energy storage, and actual wind power output at the present time point.

The for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage may include:

for the present time point t, computing the rate of turbulence of the raw wind power $r_{wp}^T$ using formulae of $$r_{wp}^T = f_{wp}\left(\frac{P_{wp}^{max} - P_{wp}^{min}}{P_{wp}^{rated}}\right), \tag{1}$$

$$P_{wp}^{max} = \max\{P_{wp}(t), P_{wp}(t-\Delta t), \ldots, P_{wp}(t-(n-1)\Delta t)\}, \tag{2}$$

$$P_{wp}^{min} = \min\{P_{wp}(t), P_{wp}(t-\Delta t), \ldots, P_{wp}(t-(n-1)\Delta t)\}, \tag{3}$$

and $$T = n\Delta t, \tag{4}$$

wherein the $P_{wp}^{rated}$ is a capacity of wind power, i.e., rated power, the $P_{wp}^{max}$ is a maximal wind power sampled within an observation time T, the $P_{wp}^{min}$ is a minimal wind power sampled within the observation time, the $\Delta t$ is a sampling interval, the $P_{wp}(t)$ is the raw wind power, the $f_{wp}$ is a raw function for computing a rate of turbulence of the wind power, and the n is a number of sampling points within the observation time;

smoothing the raw wind power by controlling the rate of change by defining the rate of change k(t) of the wind power according to the raw wind power $P_{wp}(t)$, a smoothed wind power $P_{hybrid}(t)$, and the sampling interval $\Delta t$ according to a formula of $$k(t) = \frac{P_{wp}(t) - P_{hybrid}(t - \Delta t)}{\Delta t}, \tag{5}$$

and controlling a rate of turbulence of wind and energy storage hybrid power to be within a required range using the control strategy comprising that:

for $k_{hybrid}^{drop} \leq k(t) \leq k_{hybrid}^{rise}$, $$P_{hybrid}(t) = P_{wp}(t-\Delta t) \tag{6},$$

for $k(t) > k_{hybrid}^{rise}$, $$P_{hybrid}(t) = P_{wp}(t-\Delta t) + \Delta t \cdot k_{hybrid}^{rise} \tag{7},$$

and for $k(t) < k_{hybrid}^{drop}$, $$P_{hybrid}(t) = P_{wp}(t-\Delta t) + \Delta t \cdot k_{hybrid}^{drop} \tag{8},$$

wherein the $k_{hybrid}^{rise}$ is a limiting rate of change that limits rise of wind power output, and the $k_{hybrid}^{drop}$ is a limiting rate of change that limits drop of the wind power output, with $$k_{hybrid}^{rise} = \frac{P_{wp}^{rated} \times r_{obj}^T}{T}, \text{ and} \tag{9}$$

$$k_{hybrid}^{drop} = -\frac{P_{wp}^{rated} \times r_{obj}^T}{T}, \tag{10}$$

wherein the $r_{obj}^T$ is an objective rate of turbulence;

computing the rate of turbulence of the wind and energy storage hybrid power $r_{hybrid}^T$ smoothed by controlling the rate of change, by using formulae of $$r_{hybrid}^T = f_{hybrid}\left(\frac{P_{hybrid}^{max} - P_{hybrid}^{min}}{P_{hybrid}^{rated}}\right), \tag{11}$$

$$P_{hybrid}^{max} = \max\{P_{hybrid}(t), P_{hybrid}(t-\Delta t), \ldots, P_{hybrid}(t-(n-1)\Delta t)\}, \tag{12}$$

$$P_{hybrid}^{min} = \min\{P_{hybrid}(t), P_{hybrid}(t-\Delta t), \ldots, P_{hybrid}(t-(n-1)\Delta t)\}, \tag{13}$$

and $$T = n\Delta t, \tag{14}$$

wherein the $P_{hybrid}^{max}$ is a maximal wind and energy storage hybrid power sampled within the observation time T, and the $P_{hybrid}^{min}$ is a minimal wind and energy storage hybrid power sampled within the observation time, wherein an objective of controlling a rate of turbulence of power using the change rage is to control the rate of turbulence of the wind and energy storage hybrid power smoothed to be less than a specified objective rate within the observation time, as shown by a formula of $$r_{hybrid}^T < r_{obj}^T \tag{15},$$

wherein the $r_{obj}^T$ is the objective rate of turbulence of the wind and energy storage hybrid power within the observation time T;

computing the power of the system for energy storage as $$P_{BESS}(t)=P_{hybrid}(t)-P_{wp}(t) \quad (16);$$

and computing the SOC of the energy storage as follows, wherein for $P_{BESS}(t)>0$, the system for energy storage is discharged, and the SOC decreases as shown in a formula of $$SOC(t) = SOC(t-\Delta t) - \frac{\Delta t |P_{BESS}(t)|}{W_{bat}}, \quad (17)$$

wherein for $P_{BESS}(t)<0$, the system for energy storage is charged, and the SOC increases as shown in a formula of $$SOC(t) = SOC(t-\Delta t) + \frac{\Delta t |P_{BESS}(t)|}{W_{bat}}, \quad (18)$$

wherein the $W_{bat}$ is a capacity of the system for energy storage.

The performing initialization for training an estimation module and a management module may include:

initializing a discount factor α, a learning rate $l_a$ of the management module, a learning rate $l_c$ of the estimation module, a weight $W_a$ of the management module, a weight $W_c$ of the estimation module, a maximal number of cycles, and an expected error of module training, by setting an initial weight as a random number within (−1, +1), and selecting and adjusting the learning rates and the discount factor according to an objective result of control.

The for each time point, computing and storing a control strategy, the rate of turbulence of the wind and energy storage hybrid power smoothed, power of energy storage, and the SOC of the system for energy storage may include steps of:

determining whether the rate of turbulence of the wind and energy storage hybrid power $r_{hybrid}^T$ meets $r_{lim}^T \le r_{hybrid}^T < r_{obj}^T$; in response to determining that it does, taking, by the system for energy storage, no action to correct the power of energy storage; otherwise in response to determining that it does not, performing a next step of ADP module training in seeking an optimal correction to the power of energy storage;

training the estimation module by inputting the control strategy and a state of the controlled object to the estimation module, updating the weight of the estimation module, and outputting a cost function;

training the management module by inputting, to the management module, the state of the controlled object including the rate of turbulence of the wind and energy storage hybrid power $r_{hybrid}^T$ and the power of energy storage $P_{BESS}(t)$, updating the weight of the management module, and outputting the control strategy as a correction $\Delta P_{BESS}(t)$ to the power of energy storage; and storing the control strategy for the each time point, computing the state of the controlled object for a next time point t=t+1 and repeating the steps until control ends.

The determining whether the rate of turbulence of the wind and energy storage hybrid power $r_{hybrid}^T$ meets $r_{lim}^T \le r_{hybrid}^T < r_{obj}^T$ may include:

in response to determining that $0 < r_{hybrid}^T < r_{lim}^T$, determining that the system for energy storage has been outputting too much power and needs reverse correction of $$P_{BESS}^{ADP}(t)=P_{BESS}(t)+\Delta P_{BESS}(t) \quad (22),$$

wherein the $\Delta P_{BESS}(t)$ is the correction to the power of energy storage; and in response to determining that $r_{lim}^T \le r_{hybrid}^T < r_{obj}^T$, determining that the system for energy storage has been outputting proper power and needs no correction, i.e., $$P_{BESS}^{ADP}(t)=P_{BESS}(t) \quad (23).$$

The $\Delta P_{BESS}(t)$ may be the power of the system for energy storage acquired by ADP of the power of energy storage by controlling the rate of change.

The training the estimation module by inputting the control strategy and a state of the controlled object to the estimation module, updating the weight of the estimation module, and outputting a cost function may include:

normalizing the state of the controlled object comprising the rate of turbulence of the wind and energy storage hybrid power $r_{hybrid}^T$ and the control strategy, i.e., the correction $\Delta P_{BESS}(t)$ to the power of energy storage, to be within [−1, +1];

inputting the state of the controlled object comprising the rate of turbulence of the wind and energy storage hybrid power $r_{hybrid}^T$ and the control strategy, i.e., the correction $\Delta P_{BESS}(t)$ to the power of energy storage, to the estimation module, computing the cost function $J_c^{WPBESS}(t)$ output by the estimation module, training the estimation module by building an objective function $E_{chybrid}(t)$, and updating a weight of a neural network of the estimation module according to a weight updating formula of the estimation module, using formulae of $$U(t)=[r_{hybrid}^T,\Delta P_{BESS}(t),t] \quad (24),$$

$$J_{chybrid}(t)J_c[r_{hybrid}^T,\Delta P_{BESS}(t),t,W_c] \quad (25),$$

and $$E_{chybrid}(t) = \frac{1}{2}[J_{chybrid}(t) - U(t+1) - \beta_c J_{chybrid}(t+1)]^2, \quad (26)$$

wherein the cost function $J_{chybrid}(t)$ is the output of the estimation module, the U(t) is a utility function of $r_{hybrid}^T$, $\Delta P_{BESS}(t)$, t defined according to an objective result of control, and the $\beta_c$ is a discount factor; and updating the weight $W_c$ of the neural network of the estimation module by training the estimation module via gradient descent or particle swarm optimization to minimize the objective function $E_{chybrid}(t)$, and ending the training in response to determining that the objective function $E_{chybrid}(t)$ has decreased to a set error or a maximal number of iterations has been reached.

The training the management module by inputting, to the management module, the state of the controlled object comprising the rate of turbulence of the wind and energy storage hybrid power $r_{hybrid}^T$ and the power of energy storage $P_{BESS}(t)$, updating the weight of the management module, and outputting the control strategy as a correction $\Delta P_{BESS}(t)$ to the power of energy storage may include:

training the management module by inputting, to the management module, the state of the controlled object comprising the rate of turbulence of the wind and energy storage hybrid power $r_{hybrid}^T$ hybrid and the power of energy storage $P_{BESS}(t)$;

adjusting the control strategy, i.e., the correction $\Delta P_{BESS}(t)$ to the power of energy storage, by minimizing an output $J_{chybrid}(t)$ of the estimation module using formulae of $$\Delta P_{BESS}(t)=u[r_{hybrid}^T,t,W_a] \quad (27),$$

and $$E_{ahybrid}(t) = \frac{1}{2}[J_{chybrid}(t)]^2, \quad (28)$$

wherein the control strategy $\Delta P_{BESS}(t)$ is output by the management module to adjust the power of energy storage to vary within a proper range to reduce a range of turbulence of the SOC of the system for energy storage, and the u indicates that the control strategy $\Delta P_{BESS}(t)$ is a function of $r_{hybrid}^T$, t, $W_a$; and updating a weight $w_a$ of a neural network of the management module by training the management module via gradient descent or particle swarm optimization to minimize an objective function $E_{ahybrid}(t)$, and ending the training in response to determining that the objective function $E_{ahybrid}(t)$ has decreased to a set error or a maximal number of iterations has been reached.

A system for Adaptive Dynamic Programming (ADP) control by a power station for large-scale energy storage includes a parameter initialization module, a data collection and computation module, a management module, an estimation module, and an output module.

The parameter initialization module is arranged for: setting an objective control parameter and a structure of a system for ADP control, and sending the objective control parameter to the data collection and computation module.

The data collection and computation module is arranged for: computing a rate of turbulence of wind and energy storage hybrid power according to the objective control parameter, and sending the rate of turbulence of the wind and energy storage hybrid power to the management module and the estimation module.

The management module is arranged for: acquiring a correction to power of energy storage according to the rate of turbulence of the wind and energy storage hybrid power, and sending the correction to the power of energy storage to the data collection and computation module, the management module, and the estimation module.

The estimation module is arranged for: acquiring a cost function according to the rate of turbulence of the wind and energy storage hybrid power, and sending the cost function to the management module.

The output module is arranged for: outputting a control strategy, a rate of turbulence of wind and energy storage hybrid power smoothed, the power of energy storage, and a State Of Charge (SOC) of a system for energy storage for each time point.

According to an embodiment herein, a method for Adaptive Dynamic Programming (ADP) control by a power station for large-scale energy storage may include:

for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;

determining whether the $r_{hybrid}^T$, the $P_{BESS}(t)$, and the SOC are within constraint ranges corresponding to an objective control parameter;

in response to determining that they are not within the constraint ranges, inputting the $r_{hybrid}^T$ to the management module for the present time point;

for the present time point, outputting, by the management module according to the $r_{hybrid}^T$, a control strategy for controlling charging power and discharging power of the system for energy storage of the power station for large-scale energy storage;

inputting the $r_{hybrid}^T$ and the control strategy for the present time point to the estimation module for the present time point;

outputting, by the estimation module, a cost function according to the $r_{hybrid}^T$ and the control strategy for the present time point;

building, according to the $r_{hybrid}^T$ and the cost function, an objective function for training the estimation module;

training the estimation module according to the objective function to minimize the objective function; and training the management module according to the cost function to minimize the cost function. The estimation module and the management module may be retrained for outputting the control strategy for a next time point.

The control strategy may include a correction to power of energy storage.

According to an embodiment herein, a computer-readable storage medium may have stored therein instructions executable by a computer to perform an aforementioned method.

ADP-based adaptive optimization of a power station for large-scale energy storage by battery is proposed according to embodiments herein. With the method and system according to embodiments herein, effective adaptive optimization of overall charging and discharging power of a system for large-scale energy storage by battery is implemented by considering a SOC of a power station for large-scale energy storage by battery, a feedback rate of turbulence of new energy power generation, an estimation module and a management module based on a neural network, etc. With the technical solution according to embodiments herein, smart optimization of a control algorithm is performed in real time based on the neural network, improving capability of self-study and adaptive control of the system. Power output of the system for energy storage is adaptively corrected dynamically in real time to meet a demand for incorporating wind power into the grid. In addition, the SOC of a battery for energy storage is kept within a proper range, implementing proper charging and discharging of the system for energy storage by battery, implementing optimization of real-time charging and discharging power of the system for large-scale energy storage. The method may apply to optimization of charging and discharging power of power stations (system) for energy storage of various scales as well as battery energy management.

DETAILED DESCRIPTION

Embodiments herein will be further elaborated below with reference to the drawings. Note that embodiments below are for illustrating and explaining the present disclosure, and are not intended to limit the present disclosure.

Figure 1:
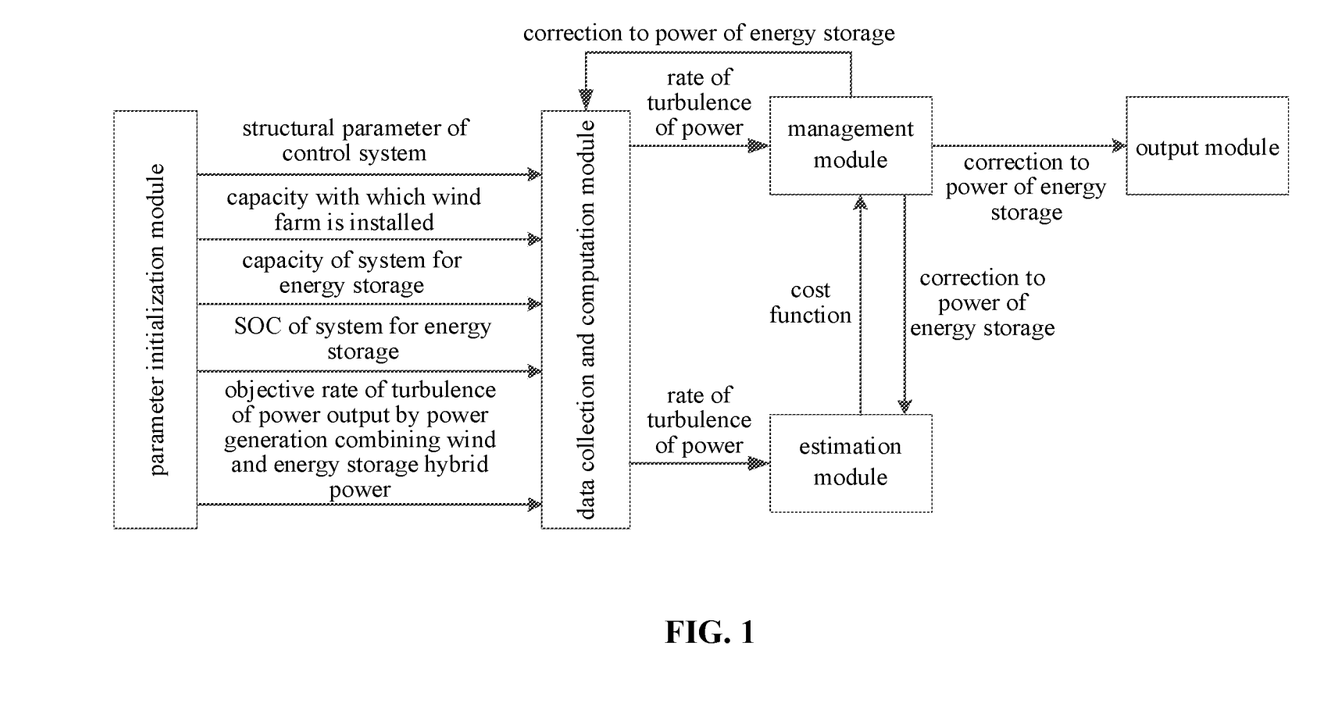
FIG. 1 is a diagram of a structure of a system for ADP control by a power station for large-scale energy storage according to an embodiment herein.

FIG. 1 shows a system for ADP control by a power station for large-scale energy storage according to an embodiment herein. The system may include modules as follows.

The system may include a parameter initialization module. The system for ADP control may include a two-layer structure of an estimation module and a management module, each of which may be built with a three-layer structure of a neural network. A parameter of the management module and the estimation module may include at least one of a discount factor $\alpha$, network learning rates $l_a$ and $l_c$, weights $W_a$ and $W_c$, a maximal number of cycles, an expected error of network training, etc.

An objective control parameter may include at least one of a capacity of wind power generation $P_{wp}^{rated}$, a capacity $W_{bat}$ of a system for energy storage, a limiting range of a State Of Charge (SOC) of the system for energy storage, a sampling interval $\Delta t$, an observation time T, an objective rate of turbulence $r_{obj}^T$, a limiting rate of turbulence $r_{lim}^T$, etc.

An initial state of a controlled object may include an initial rate of turbulence of wind power, an initial SOC of the system for energy storage, actual wind power output for a present time point, etc. The controlled object may be the power station for large-scale energy storage.

The system may include a data collection and computation module. The actual wind power output as well as charging power and discharging power of the system for energy storage may be acquired. The rate of turbulence of the wind power and the SOC may be computed in real time. It may be determined in real time whether the state parameters are within constraint ranges. The charging power and the discharging power of the system for energy storage may be adjusted when the state parameters are not within the constraint ranges.

The estimation module may be trained as follows. The rate of turbulence of the wind power $r_{hybrid}^T$ and a control strategy, i.e., a correction $\Delta P_{BESS}(t)$ to power of energy storage may be input to the estimation module. A cost function $J_c^{WPBESS}(t)$ output by the estimation module may be computed. The estimation module may be trained by building an objective function $E_{chybrid}(t)$. The weight of the neural network of the estimation module may be updated according to a weight updating formula of the estimation module. The rate of turbulence of the wind power $r_{hybrid}^T$ and the control strategy, i.e., the correction $\Delta P_{BESS}(t)$ to the power of energy storage, may have to be normalized to be within [−1, +1] before being sent into the network for computation. The objective function may be built according to the cost function. After the objective function $E_{chybrid}(t)$ has been built, the estimation module may be retrained by minimizing the objective function, for acquiring, according to the rate of turbulence of the wind power $r_{hybrid}^T$ collected at a next collecting time point and the control strategy output by the management module, the cost function for next management module training.

The weight $W_c$ of the neural network of the estimation module may be updated by training the estimation module by minimizing the objective function $E_{chybrid}(t)$ The training may end when the objective function $E_{chybrid}(t)$ has decreased to a set error or a maximal number of iterations has been reached.

The management module may be trained by minimizing the output $J_{chybrid}(t)$ of the estimation module. The weight $W_a$ of the neural network of the management module may be updated according to a weight updating formula of the management module. The control strategy, i.e., the correction $\Delta P_{BESS}(t)$ to the power of energy storage, may be adjusted by training the management module by minimizing the output $J_{chybrid}(t)$ of the estimation module. The weight $W_a$ of the neural network of the management module may be updated by minimizing the objective function $E_{ahybrid}(t)$. The training may end when the objective function $E_{ahybrid}(t)$ has decreased to a set error or a maximal number of iterations has been reached.

Note that the objective function $E_{chybrid}(t)$ for training the estimation module and the objective function $E_{ahybrid}(t)$ for training the management module may differ. The $E_{ahybrid}(t)$ may be positively correlated with a value of the cost function. Accordingly, the management module may be trained by minimizing the $E_{ahybrid}(t)$.

The system may include an output module. The control strategy for each time point may be stored and output in real time. The smoothing process may be adjusted in real time on line to control the charging power and the discharging power of the system for energy storage. The charging power and the discharging power of the system for energy storage may be controlled by the control strategy.

To sum up, with the present disclosure, both new energy power generation and a system for large-scale energy storage may be incorporated and operated in a grid, and optimal charging and discharging power of the system for energy storage such as a capacity of the system for large-scale energy storage, etc., may be found, by adjusting power of a power station for large-scale energy storage in real time using an ADP algorithm considering both a rate of turbulence of power output of the new energy power generation and the SOC of the system for large-scale energy storage by battery. An ADP algorithm may be independent of an accurate mathematical model of a controlled system or process, and be capable of online self-study to adapt to a change of a system parameter, with great robustness. Therefore, with the present disclosure, the power output of the new energy power generation may be smoothed on line adaptively by adaptive smoothing control with an ADP algorithm, optimizing a result of controlling the system for large-scale energy storage by battery.

Figure 2:
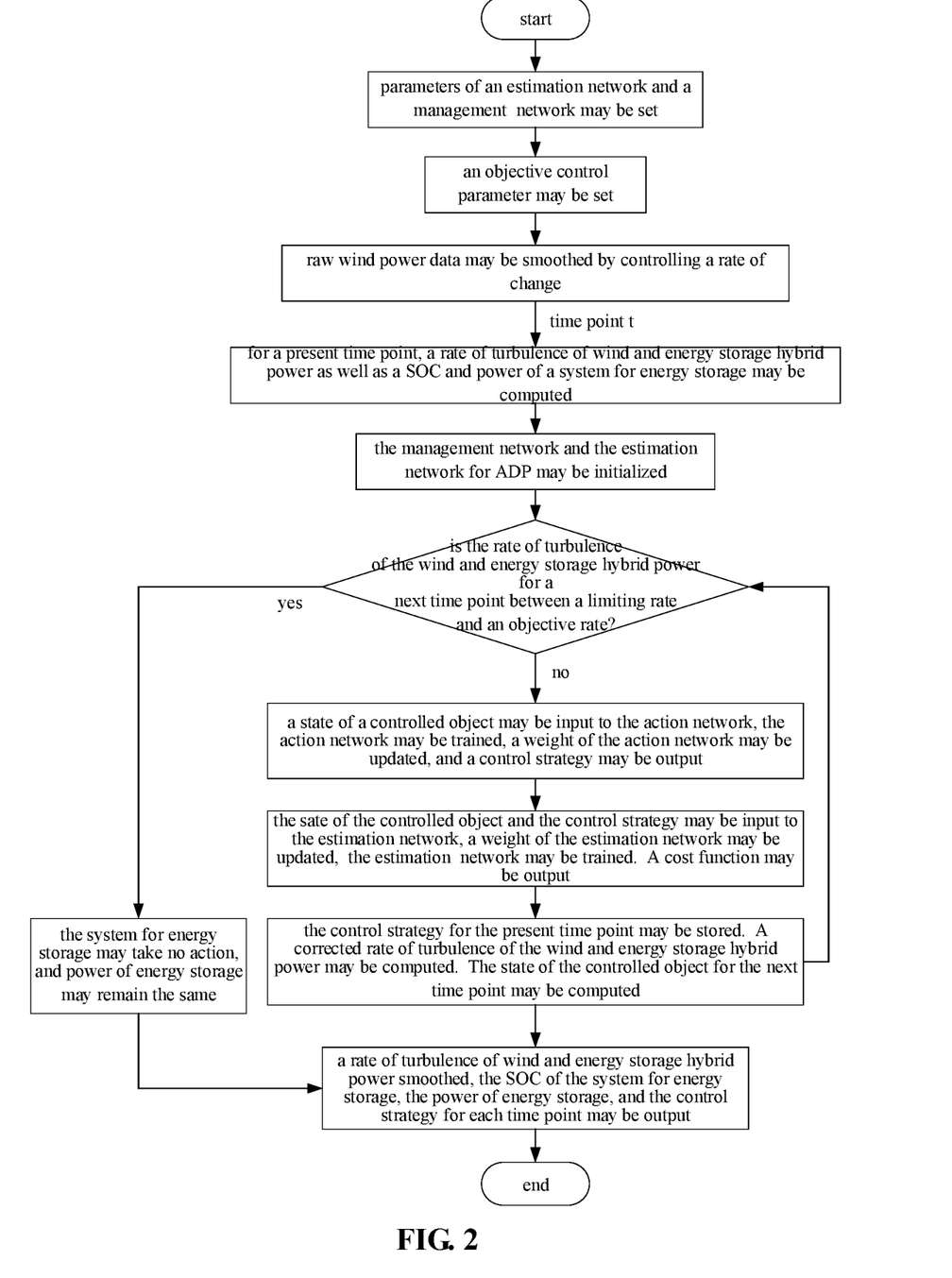
FIG. 2 is a flowchart of a method for ADP control by a power station for large-scale energy storage according to an embodiment herein.

FIG. 2 shows a method for ADP control by a power station for large-scale energy storage according to an embodiment herein. The method may include steps as follows.

In step 1, a structure of a system for ADP control, parameters of a management module and an estimation module, and objective control parameter may be set.

The system for ADP control may include a two-layer structure of the estimation module and the management module. Alternatively, the system for ADP control may include a three-layer structure of a model module, the estimation module, and the management module. Each module may be built with a three-layer structure of a neural network. A parameter of the management module and the estimation module may include at least one of a discount factor $\alpha$, network learning rates $l_a$ and $l_c$, weights $W_a$ and $W_c$, a maximal number of cycles, an expected error of network training, etc. An initial weight may be set as a random number within (−1, +1). The learning rates and the discount factor may be selected and adjusted according to an objective result of control. A proper model of a neural network, including at least one of a mode of training, a parameter, a structure, and a type of the network, etc., may be selected via coordinated optimization considering particulars of a controlled object, a convergence speed, an accuracy of a result of computation, etc.

An action network in FIG. 2 may correspond to the neural network of the management module herein. an estimation network in FIG. 2 may be the neural network of the estimation module.

An objective control parameter may include at least one of a capacity of wind power generation $P_{wp}^{rated}$, a capacity $W_{bat}$ of a system for energy storage, a limiting range of a State Of Charge (SOC) of the system for energy storage, a sampling interval $\Delta t$, an observation time T, an objective rate of turbulence $r_{obj}^T$, a limiting rate of turbulence $r_{lim}^T$, etc.

In step 2, parameter initialization may be performed. An initialized parameter may be imported as an initial state of a controlled object.

The initialized parameter may include at least one of an initial rate of turbulence of wind power, an initial SOC of the system for energy storage, actual wind power output at the present time point, etc.

In step 3, a rate of turbulence of raw wind power $r_{wp}^T$ for a present time point t may be computed. The raw wind power may be smoothed by controlling a rate of change. A rate of turbulence of wind and energy storage hybrid power $r_{hybrid}^T$ smoothed may be computed. Power $P_{BESS}(t)$ of a system for energy storage may be computed. A State Of Charge (SOC) of the system for energy storage may be computed.

In step 4, initialization may be performed for training the estimation module and the management module.

The rate of turbulence of the raw wind power $r_{wp}^T$ for the present time point t may be computed and the raw wind power may be smoothed by controlling the rate of change as follows.

The rate of change k(t) of the wind power may be defined according to the raw wind power $P_{wp}(t)$, a smoothed wind power $P_{hybrid}(t)$, and the sampling interval $\Delta t$ according to a formula of $$k(t) = \frac{P_{wp}(t) - P_{hybrid}(t - \Delta t)}{\Delta t}. \quad (5)$$

A rate of turbulence of wind and energy storage hybrid power may be controlled to be within a required range using the control strategy as follows.

For $k_{hybrid}^{drop} \leq k(t) \leq k_{hybrid}^{rise}$, $$P_{hybrid}(t) = P_{wp}(t - \Delta t) \quad (6).$$

For $k(t) \geq k_{hybrid}^{rise}$, $$P_{hybrid}(t) = P_{wp}(t - \Delta t) + \Delta t \cdot k_{hybrid}^{rise} \quad (7).$$

For $k(t) < k_{hybrid}^{drop}$, $$P_{hybrid}(t) = P_{wp}(t - \Delta t) + \Delta t \cdot k_{hybrid}^{drop} \quad (8).$$

The $k_{hybrid}^{rise}$ may be a limiting rate of change that limits rise of wind power output, as defined below. The $k_{hybrid}^{drop}$ may be a limiting rate of change that limits drop of the wind power output, as defined below.

$$k_{hybrid}^{rise} = \frac{P_{wp}^{rated} \times r_{obj}^T}{T}. \quad (9)$$

$$k_{hybrid}^{drop} = -\frac{P_{wp}^{rated} \times r_{obj}^T}{T}. \quad (10)$$

The rate of turbulence of the wind and energy storage hybrid power $r_{hybrid}^T$ may be smoothed by controlling the rate of change, using formulae as follows.

$$r_{hybrid}^T = f_{hybrid}\left(\frac{P_{hybrid}^{max} - P_{hybrid}^{min}}{P_{hybrid}^{rated}}\right). \quad (11)$$

$$P_{hybrid}^{max} = \max\{P_{hybrid}(t), P_{hybrid}(t - \Delta t), \ldots, P_{hybrid}(t - (n-1)\Delta t)\}. \quad (12)$$

$$P_{hybrid}^{min} = \min\{P_{hybrid}(t), P_{hybrid}(t - \Delta t), \ldots, P_{hybrid}(t - (n-1)\Delta t)\}. \quad (13)$$

$$T = n\Delta t. \quad (14)$$

The $P_{hybrid}^{max}$ may be a maximal wind and energy storage hybrid power sampled within the observation time T. The $P_{hybrid}^{min}$ may be a minimal wind and energy storage hybrid power sampled within the observation time, A rate of turbulence of power may be controlled using the change rage to control the rate of turbulence of the wind and energy storage hybrid power smoothed to be less than a specified objective rate within the observation time, as shown by a formula of $$r_{hybrid}^T < r_{obj}^T \quad (15),$$

The $r_{obj}^T$ may be the objective rate of turbulence of the wind and energy storage hybrid power within the observation time T.

Charging power and discharging power of the system for energy storage may be computed according to the above formulae. The power of energy storage for a time point t may be computed according to a formula of $$P_{BESS} = P_{hybrid}(t) - P_{wp}(t) \quad (16).$$

The SOC of the energy storage may be computed as follows.

For $P_{BESS}(t) > 0$, the system for energy storage may be discharged. The SOC may decrease according to a formula of $$SOC(t) = SOC(t - \Delta t) - \frac{\Delta t |P_{BESS}(t)|}{W_{bat}}. \quad (17)$$

For $P_{BESS}(t) < 0$, the system for energy storage may be charged. The SOC may increase according to a formula of $$SOC(t) = SOC(t - \Delta t) + \frac{\Delta t |P_{BESS}(t)|}{W_{bat}}. \quad (18)$$

The $W_{bat}$ may be a capacity of the system for energy storage.

In step 5, it may be determined whether the rate of turbulence of the wind and energy storage hybrid power $r_{hybrid}^T$ meets a constraint of $r_{lim}^T \leq r_{hybrid}^T < r_{obj}^T$. When it does not meet the constraint, a next step of ADP network training may be performed to seek an optimal correction to the power of energy storage. When it meets the constraint, the system for energy storage may take no action to correct the power of energy storage.

It may be determined whether ADP adjustment or regulation of the power of energy storage is required as follows. Based on the power of energy storage $P_{BESS}(t)$ of the system for energy storage and the rate of turbulence of the wind and energy storage hybrid power $r_{hybrid}^T$ acquired by controlling the rate of change, a limiting rate $r_{lim}^T$ may be newly defined to limit the rate of turbulence of the wind and energy storage hybrid power. The control strategy as follows may be formulated according to the limiting rate and the objective rate of turbulence $r_{obj}{}^T$.

For $0 < r_{hybrid}{}^T < r_{lim}{}^T$, the system for energy storage has been outputting too much power. Thus reverse correction as follows may be required.

$$P_{BESS}{}^{ADP}(t) = P_{BESS}(t) + \Delta P_{BESS} \qquad (22).$$

For $r_{lim}{}^T \leq r_{hybrid}{}^T < r_{obj}{}^T$, the system for energy storage has been outputting proper power. Thus no correction may be necessary.

$$P_{BESS}{}^{ADP}(t) \leq P_{BESS}(t) \qquad (23).$$

The $P_{BESS}{}^{ADP}(t)$ may be the power of the system for energy storage acquired by ADP of the power of energy storage by controlling the rate of change.

In step 6, a management network may be trained by inputting, to the management network, the state of the controlled object, i.e., the rate of turbulence of the wind and energy storage hybrid power $r_{hybrid}{}^T$, the power of energy storage $P_{BESS}(t)$, etc. The weight of the management network may be updated. The control strategy, i.e., a correction $\Delta P_{BESS}(t)$ to the power of energy storage, may be output.

The management network may be trained as follows.

The management module may be trained by minimizing the output $J_{chybrid}(t)$ of the estimation module. The weight $W_a$ of the neural network of the management module may be updated according to a weight updating formula of the management module. The control strategy, i.e., the correction $\Delta P_{BESS}(t)$ to the power of energy storage, may be adjusted by training the management module by minimizing the output $J_{chybrid}(t)$ of the estimation module. The weight $W_a$ of the neural network of the management module may be updated by minimizing the objective function $E_{ahybrid}(t)$. The training may end when the objective function $E_{ahybrid}(t)$ has decreased to a set error or a maximal number of iterations has been reached.

In step 7, an estimation network may be trained by inputting the control strategy and a state of the controlled object to the estimation network. The weight of the estimation network may be updated. A cost function may be output.

The estimation network may be trained as follows.

The rate of turbulence of the wind power $r_{hybrid}{}^T$ and a control strategy, i.e., a correction $\Delta P_{BESS}(t)$ to power of energy storage may be input to the estimation module. A cost function $J_c{}^{WPBESS}(t)$ output by the estimation module may be computed. The estimation module may be trained by building an objective function $E_{chybrid}(t)$. The weight of the neural network of the estimation module may be updated according to a weight updating formula of the estimation module. The rate of turbulence of the wind power $r_{hybrid}{}^T$ and the control strategy, i.e., the correction $\Delta P_{BESS}(t)$ to the power of energy storage, may have to be normalized to be within [−1, +1] before being sent into the network for computation.

The weight $W_c$ of the neural network of the estimation module may be updated by training the estimation module by minimizing the objective function $E_{chybrid}(t)$. The training may end when the objective function $E_{chybrid}(t)$ has decreased to a set error or a maximal number of iterations has been reached.

In step 8, the control strategy for the time may be stored. The state of the controlled object for a next time point $t = t+1$ may be computed. The steps 5-7 may be repeated.

In step 9, the steps may be cycled until control ends. The rate of turbulence of the wind and energy storage hybrid power $r_{hybrid}{}^{ADP}$ smoothed, the power of energy storage $P_{BESS}{}^{ADP}(t)$, the SOC of the system for energy storage, the control strategy for each time point, etc., may be output.

According to an embodiment herein, a method for ADP control by a power station for large-scale energy storage may include steps as follows.

A rate of turbulence of raw wind power $r_{wp}{}^T$ for a present time point t may be computed. The raw wind power may be smoothed by controlling a rate of change. A rate of turbulence of wind and energy storage hybrid power $r_{hybrid}{}^T$ smoothed may be computed. Power $P_{BESS}(t)$ of a system for energy storage may be computed. A State Of Charge (SOC) of the system for energy storage may be computed.

It may be determined whether the $r_{hybrid}{}^T$, the $P_{BESS}(t)$, and the SOC are within constraint ranges corresponding to an objective control parameter.

When they are not within the constraint ranges, the $r_{hybrid}{}^T$ may be input to the management module for the present time point.

The management module for the present time point may output a control strategy according to the $r_{hybrid}{}^T$. The control strategy may be for controlling charging power and discharging power of the system for energy storage of the power station for large-scale energy storage.

The $r_{hybrid}{}^T$ and the control strategy for the present time point may be input to the estimation module for the present time point.

The estimation module may output a cost function according to the $r_{hybrid}{}^T$ and the control strategy for the present time point.

An objective function for training the estimation module may be built according to the $r_{hybrid}{}^T$ and the cost function.

The estimation module may be trained according to the objective function by minimizing the objective function.

The management module may be trained according to the cost function by minimizing the cost function. The estimation module and the management module may be retrained for outputting the control strategy for a next time point.

The $P_{BESS}(t)$ may include the charging power and the discharging power. It may be determined that the $P_{BESS}(t)$ is within the constraint range thereof when the charging power is no less than minimal charging power and no greater than maximal charging power allowed, and the discharging power is no less than minimal discharging power and no greater than maximal discharging power allowed. The minimal charging power and/or the minimal discharging power may be 0.

It may be determined that the SOC is within the constraint range thereof when the SOC is no greater than a maximal SOC allowed for the system for energy storage in work, and no less than a minimal SOC allowed for the system for energy storage in work.

It may be determined that the $r_{hybrid}{}^T$ is within the constraint range thereof when the $r_{hybrid}{}^T$ is less than the objective rate. It may be determined that no adjustment is necessary and no control strategy may have to be output only when all three parameters are within the respective constraint ranges thereof. Otherwise one or more of these parameters may be input to the management module for the present time point to output the control strategy for the present time point for controlling charging power and discharging power of the system for energy storage, and retraining the management module and the estimation module, so as to facilitate subsequent more accurate control of the system for energy storage of the power station for large-scale energy storage.

The control strategy may include a correction to power of energy storage. The system for energy storage of the power station for large-scale energy storage may adjust the charging power and the discharging power per se according to the correction to the power of energy storage.

According to an embodiment herein, a computer-readable storage medium may have stored therein instructions executable by a computer to perform any aforementioned method.

The computer-readable storage medium herein may be various types of storage media. The computer-readable storage medium herein may be a non-transitory storage medium.

As shown in FIG. 1, a system for ADP control by a power station for large-scale energy storage may include at least one of a parameter initialization module, a data collection and computation module, a management module, an estimation module, an output module, etc.

The parameter initialization module may be arranged for: setting an objective control parameter and a structure of a system for ADP control, and sending the objective control parameter to the data collection and computation module.

The data collection and computation module may be arranged for: computing a rate of turbulence of wind and energy storage hybrid power according to the objective control parameter, and sending the rate of turbulence of the wind and energy storage hybrid power to the management module and the estimation module.

The management module may be arranged for: acquiring a correction to power of energy storage according to the rate of turbulence of the wind and energy storage hybrid power, and sending the correction to the power of energy storage to the data collection and computation module, the management module, and the estimation module.

The estimation module may be arranged for: acquiring a cost function according to the rate of turbulence of the wind and energy storage hybrid power, and sending the cost function to the management module.

The output module may be arranged for: outputting a control strategy, a rate of turbulence of wind and energy storage hybrid power smoothed, the power of energy storage, and a State Of Charge (SOC) of a system for energy storage for each time point.

Note that embodiments herein are for illustrating the present disclosure instead of limiting the present disclosure. Any modification made according to the principle of the present disclosure shall be deemed to fall within the scope of the present disclosure.

The invention claimed is:

1. A method for Adaptive Dynamic Programming (ADP) control by a power station for large-scale energy storage, comprising:
setting an objective control parameter and a structure of a system for ADP control;
performing parameter initialization, and importing an initialized parameter as an initial state of a controlled object;
for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;
performing initialization for training an estimation module and a management module;
for each time point, computing and storing a control strategy, the rate of turbulence of the wind and energy storage hybrid power smoothed, power of energy storage, and the SOC of the system for energy storage; and
outputting the rate of turbulence of the wind and energy storage hybrid power smoothed, the power of energy storage, the SOC of the system for energy storage, and the control strategy for the each time point,
wherein the system for ADP control comprises a two-layer structure of the estimation module and the management module,
wherein each of the estimation module and the management module is built with a three-layer structure of a neural network,
wherein the objective control parameter comprises a capacity of wind power generation $P_{wp}^{rated}$, a capacity $W_{bat}$ of the system for energy storage, a limiting range of the SOC of the system for energy storage, a sampling interval $\Delta t$, an observation time T, an objective rate of turbulence $r_{obj}^T$, and a limiting rate of turbulence $r_{lim}^T$.

2. The method according to claim 1, wherein the initialized parameter comprises an initial rate of turbulence of wind power, an initial SOC of the system for energy storage, and actual wind power output at the present time point.

3. The method according to claim 1, wherein the for a present time point t, computing a rate of turbulence of raw wind power $r_{wp}^T$, smoothing the raw wind power by controlling a rate of change, and computing a rate of turbulence of wind and energy storage hybrid power hybrid $r_{hybrid}^T$ smoothed, power $P_{PBESS}(t)$ of a system for energy storage, and a State Of Charge (SOC) of the system for energy storage comprises:
for the present time point t, computing the rate of turbulence of the raw wind power $r_{wp}^T$ using formulae of $$r_{wp}^T = f_{wp}\left(\frac{P_{wp}^{max} - P_{wp}^{min}}{P_{wp}^{rated}}\right), \tag{1}$$

$$P_{wp}^{max} = \max\{P_{wp}(t), P_{wp}(t-\Delta t), \ldots, P_{wp}(t-(n-1)\Delta t)\}, \tag{2}$$

$$P_{wp}^{min} = \min\{P_{wp}(t), P_{wp}(t-\Delta t), \ldots, P_{wp}(t-(n-1)\Delta t)\}, \tag{3}$$

and $$T = n\Delta t, \tag{4}$$

wherein the $P_{wp}^{rated}$ is a capacity of wind power, i.e., rated power, the $P_{wp}^{max}$ is a maximal wind power sampled within an observation time T, the $P_{wp}(t)$ is a minimal wind power sampled within the observation time, the $\Delta t$ is a sampling interval, the $P_{wp}(t)$ is the raw wind power, the $f_{wp}$ is a raw function for computing a rate of turbulence of the wind power, and the n is a number of sampling points within the observation time;
smoothing the raw wind power by controlling the rate of change by
defining the rate of change k(t) of the wind power according to the raw wind power $P_{wp}(t)$, a smoothed wind power $P_{hybrid}(t)$, and the sampling interval $\Delta t$ according to a formula of $$k(t) = \frac{P_{wp}(t) - P_{hybrid}(t-\Delta t)}{\Delta t}, \tag{5}$$

and controlling a rate of turbulence of wind and energy storage hybrid power to be within a required range using the control strategy comprising that:
for $k_{hybrid}^{drop} \leq k(t) \leq k_{hybrid}^{rise}$, $$P_{hybrid}(t) = P_{wp}(t-\Delta t) \tag{6},$$

for $k(t) > k_{hybrid}^{rise}$, $$P_{hybrid}(t) = P_{wp}(t-\Delta t) + \Delta t \cdot k_{hybrid}^{rise} \qquad (7),$$

and for $k(t) < k_{hybrid}^{drop}$, $$P_{hybrid}(t) = P_{wp}(t-\Delta t) + \Delta t \cdot k_{hybrid}^{drop} \qquad (8),$$

wherein the $k_{hybrid}^{rise}$ is a limiting rate of change that limits rise of wind power output, and the $k_{hybrid}^{drop}$ is a limiting rate of change that limits drop of the wind power output, with $$k_{hybrid}^{rise} = \frac{P_{wp}^{rated} \times r_{obj}^{T}}{T}, \text{ and} \qquad (9)$$

$$k_{hybrid}^{drop} = -\frac{P_{wp}^{rated} \times r_{obj}^{T}}{T}, \qquad (10)$$

wherein the $r_{obj}^{T}$ is an objective rate of turbulence;
computing the rate of turbulence of the wind and energy storage hybrid power $r_{hybrid}^{T}$ smoothed by controlling the rate of change, by using formulae of $$r_{hybrid}^{T} = f_{hybrid}\left(\frac{P_{hybrid}^{max} - P_{hybrid}^{min}}{P_{hybrid}^{rated}}\right), \qquad (11)$$

$$P_{hybrid}^{max} = \max\{P_{hybrid}(t), P_{hybrid}(t-\Delta t), \ldots, P_{hybrid}(t-(n-1)\Delta t)\}, \qquad (12)$$

$$P_{hybrid}^{min} = \min\{P_{hybrid}(t), P_{hybrid}(t-\Delta t), \ldots, P_{hybrid}(t-(n-1)\Delta t)\}, \qquad (13)$$

and $$T = n\Delta t, \qquad (14)$$

wherein the $P_{hybrid}^{max}$ is a maximal wind and energy storage hybrid power sampled within the observation time T, and the $P_{hybrid}^{min}$ is a minimal wind and energy storage hybrid power sampled within the observation time,
wherein an objective of controlling a rate of turbulence of power using the change rage is to control the rate of turbulence of the wind and energy storage hybrid power smoothed to be less than a specified objective rate within the observation time, as shown by a formula of $$r_{hybrid}^{T} < r_{obj}^{T} \qquad (15),$$

wherein the $r_{obj}^{T}$ is the objective rate of turbulence of the wind and energy storage hybrid power within the observation time T;
computing the power of the system for energy storage as $$P_{BESS}(t) = P_{hybrid}(t) - P_{wp}(t) \qquad (16);$$

and computing the SOC of the energy storage as follows, wherein for $P_{BESS}(t) > 0$, the system for energy storage is discharged, and the SOC decreases as shown in a formula of $$SOC(t) = SOC(t-\Delta t) - \frac{\Delta t |P_{BESS}(t)|}{W_{bat}}, \qquad (17)$$

wherein for $P_{BESS}(t) < 0$, the system for energy storage is charged, and the SOC increases as shown in a formula of $$SOC(t) = SOC(t-\Delta t) + \frac{\Delta t |P_{BESS}(t)|}{W_{bat}}, \qquad (18)$$

wherein the $W_{bat}$ is a capacity of the system for energy storage.

4. The method according to claim 1, wherein the performing initialization for training an estimation module and a management module comprises: initializing a discount factor α, a learning rate $l_a$ of the management module, a learning rate $l_c$ of the estimation module, a weight $W_a$ of the management module, a weight $W_c$ of the estimation module, a maximal number of cycles, and an expected error of module training, by setting an initial weight as a random number within (−1, +1), and selecting and adjusting the learning rates and the discount factor according to an objective result of control.

5. The method according to claim 1, wherein the for each time point, computing and storing a control strategy, the rate of turbulence of the wind and energy storage hybrid power smoothed, power of energy storage, and the SOC of the system for energy storage comprises steps of:
determining whether the rate of turbulence of the wind and energy storage hybrid power $r_{hybrid}^{T}$ meets $r_{lim}^{T} \leq r_{hybrid}^{T} < r_{obj}^{T}$; in response to determining that it does, taking, by the system for energy storage, no action to correct the power of energy storage; otherwise in response to determining that it does not, performing a next step of ADP module training in seeking an optimal correction to the power of energy storage;
training the estimation module by inputting the control strategy and a state of the controlled object to the estimation module, updating the weight of the estimation module, and outputting a cost function;
training the management module by inputting, to the management module, the state of the controlled object comprising the rate of turbulence of the wind and energy storage hybrid power $r_{hybrid}^{T}$ and the power of energy storage $P_{BESS}(t)$, updating the weight of the management module, and outputting the control strategy as a correction $\Delta P_{BESS}(t)$ to the power of energy storage; and
storing the control strategy for the each time point, computing the state of the controlled object for a next time point $t=t+1$ and repeating the steps until control ends.

6. The method according to claim 5, wherein the determining whether the rate of turbulence of the wind and energy storage hybrid power $r_{hybrid}^{T}$ meets $r_{lim}^{T} \leq r_{hybrid}^{T} r_{obj}^{T}$ comprises:
in response to determining that $0 < r_{hybrid}^{T} < r_{lim}^{T}$, determining that the system for energy storage has been outputting too much power and needs reverse correction of $$P_{BESS}^{ADP}s(t) = P_{BESS}(t) + \Delta P_{BESS}(t) \qquad (22),$$

wherein the $\Delta P_{BESS}(t)$ is the correction to the power of energy storage; and
in response to determining that $r_{lim}^{T} \leq r_{hybrid}^{T} < r_{obj}^{T}$, determining that the system for energy storage has been outputting proper power and needs no correction, i.e., $$P_{BESS}^{ADP}(t) = P_{BESS}(t) \qquad (23),$$

wherein the $P_{BESS}^{ADP}(t)$ is the power of the system for energy storage acquired by ADP of the power of energy storage by controlling the rate of change.

7. The method according to claim 5, wherein the training the estimation module by inputting the control strategy and a state of the controlled object to the estimation module, updating the weight of the estimation module, and outputting a cost function comprises:

neutralizing the state of the controlled object comprising the rate of turbulence of the wind and energy storage hybrid power $r_{hybrid}^T$ and the control strategy, i.e., the correction $\Delta P_{BESS}(t)$ to the power of energy storage, to be within $[-1, +1]$;

inputting the state of the controlled object comprising the rate of turbulence of the wind and energy storage hybrid power $r_{hybrid}^T$ and the control strategy, i.e., the correction $\Delta P_{BESS}(t)$ to the power of energy storage, to the estimation module, computing the cost function $J_c^{WPBESS}(t)$ output by the estimation module, training the estimation module by building an objective function $E_{chybrid}(t)$, and updating a weight of a neural network of the estimation module according to a weight updating formula of the estimation module, using formulae of $$U(t)=[r_{hybrid}^T, \Delta P_{BESS}(t), t] \quad (24),$$

$$J_{chybrid}(t)=J_c[r_{hybrid}^T, \Delta P_{BESS}(t), t, W_c] \quad (25),$$

and $$E_{chybrid}(t) = \frac{1}{2}[J_{chybrid}(t) - U(t+1) - \beta_c J_{chybrid}(t+1)]^2, \quad (26)$$

wherein the cost function $J_{chybrid}(t)$ is the output of the estimation module, the $U(t)$ is a utility function of $r_{hybrid}^T$, $\Delta P_{BESS}(t)$, t defined according to an objective result of control, and the $\beta_c$ is a discount factor; and updating the weight $W_c$ of the neural network of the estimation module by training the estimation module via gradient descent or particle swarm optimization to minimize the objective function $E_{chybrid}(t)$, and ending the training in response to determining that the objective function $E_{chybrid}(t)$ has decreased to a set error or a maximal number of iterations has been reached.

8. The method according to claim 5, wherein the training the management module by inputting, to the management module, the state of the controlled object comprising the rate of turbulence of the wind and energy storage hybrid power $r_{hybrid}^T$ and the power of energy storage $P_{BESS}(t)$, updating the weight of the management module, and outputting the control strategy as a correction $\Delta P_{BESS}(t)$ BESS to the power of energy storage comprises:

training the management module by inputting, to the management module, the state of the controlled object comprising the rate of turbulence of the wind and energy storage hybrid power $r_{hybrid}^T$ and the power of energy storage $P_{BESS}(t)$;

adjusting the control strategy, i.e., the correction $\Delta P_{BESS}(t)$ to the power of energy storage, by minimizing an output $J_{chybrid}(t)$ of the estimation module using formulae of $$\Delta P_{BESS}(t)=u[r_{hybrid}^T, t, W_a] \quad (27),$$

and $$E_{ahybrid}(t)=\frac{1}{2}[J_{chybrid}(t)]^2 \quad (28),$$

wherein the control strategy $\Delta P_{BESS}(t)$ is output by the management module to adjust the power of energy storage to vary within a proper range to reduce a range of turbulence of the SOC of the system for energy storage, and the u indicates that the control strategy $\Delta P_{BESS}(t)$ is a function of $r_{hybrid}^T$, $W_a$; and updating a weight $W_a$ of a neural network of the management module by training the management module via gradient descent or particle swarm optimization to minimize an objective function $E_{ahybrid}(t)$, and ending the training in response to determining that the objective function $E_{ahybrid}(t)$ has decreased to a set error or a maximal number of iterations has been reached.

9. A system for Adaptive Dynamic Programming (ADP) control by a power station for large-scale energy storage, comprising:

a processor; and memory storing instructions executable by the processor, wherein the processor is arranged for:

setting an objective control parameter and a structure of a system for ADP control;

performing parameter initialization, and importing an initialized parameter as an initial state of a controlled object;

for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;

performing initialization for training an estimation module and a management module;

for each time point, computing and storing a control strategy, the rate of turbulence of the wind and energy storage hybrid power smoothed, power of energy storage, and the SOC of the system for energy storage; and outputting the rate of turbulence of the wind and energy storage hybrid power smoothed, the power of energy storage, the SOC of the system for energy storage, and the control strategy for the each time point, wherein the system for ADP control comprises a two-layer structure of the estimation module and the management module, wherein each of the estimation module and the management module is built with a three-layer structure of a neural network, wherein the objective control parameter comprises a capacity of wind power generation $P_{wp}^{rated}$, a capacity $W_{bat}$ of the system for energy storage, a limiting range of the SOC of the system for energy storage, a sampling interval $\Delta t$, an observation time T, an objective rate of turbulence $r_{obj}^T$, and a limiting rate of turbulence $r_{lim}^T$.

10. The system according to claim 9, wherein the system for ADP control comprises a two-layer structure of the estimation module and the management module, wherein each of the estimation module and the management module is built with a three-layer structure of a neural network, wherein the objective control parameter comprises a capacity of wind power generation $P_{wp}^{rated}$, a capacity $W_{bat}$ of the system for energy storage, a limiting range of the SOC of the system for energy storage, a sampling interval $\Delta t$, an observation time T, an objective rate of turbulence $r_{obj}^T$, and a limiting rate of turbulence.

11. The system according to claim 9, wherein the initialized parameter comprises an initial rate of turbulence of wind power, an initial SOC of the system for energy storage, and actual wind power output at the present time point.

12. The system according to claim 9, wherein the for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage comprises:

for the present time point t, computing the rate of turbulence of the raw wind power $r_{wp}^T$ using formulae of $$r_{wp}^T = f_{wp}\left(\frac{P_{wp}^{max} - P_{wp}^{min}}{P_{wp}^{rated}}\right), \tag{1}$$

$$P_{wp}^{max} = \max\{P_{wp}(t), P_{wp}(t - \Delta t), \ldots, P_{wp}(t - (n-1)\Delta t)\}, \tag{2}$$

$$P_{wp}^{min} = \min\{P_{wp}(t), P_{wp}(t - \Delta t), \ldots, P_{wp}(t - (n-1)\Delta t)\}, \tag{3}$$

and $$T = n\Delta t, \tag{4}$$

wherein the $P_{wp}^{rated}$ is a capacity of wind power, i.e., rated power, the $P_{wp}^{max}$ is a maximal wind power sampled within an observation time T, the $P_{wp}^{min}$ is a minimal wind power sampled within the observation time, the $\Delta t$ is a sampling interval, the $P_{wp}(t)$ is the raw wind power, the $f_{wp}$ is a raw function for computing a rate of turbulence of the wind power, and the n is a number of sampling points within the observation time;

smoothing the raw wind power by controlling the rate of change by defining the rate of change k(t) of the wind power according to the raw wind power $P_{wp}(t)$, a smoothed wind power $P_{hybrid}(t)$, and the sampling interval $\Delta t$ according to a formula of $$k(t) = \frac{P_{wp}(t) - P_{hybrid}(t - \Delta t)}{\Delta t}, \tag{5}$$

and controlling a rate of turbulence of wind and energy storage hybrid power to be within a required range using the control strategy comprising that:

for $k_{hybrid}^{drop} \leq (t) \leq k_{hybrid}^{rise}$, $$P_{hybrid}(t) = P_{wp}(t - \Delta t) \tag{6},$$

for $k(t) > k_{hybrid}^{rise}$, $$P_{hybrid}(t) = P_{wp}(t - \Delta t) + \Delta t \cdot k_{hybrid}^{rise} \tag{7},$$

and for $k(t) < k_{hybrid}^{drop}$, $$P_{hybrid}(t) = P_{wp}(t - \Delta t) + \Delta t \cdot k_{hybrid}^{drop} \tag{8},$$

wherein the $k_{hybrid}^{rise}$ is a limiting rate of change that limits rise of wind power output, and the $k_{hybrid}^{drop}$ is a limiting rate of change that limits drop of the wind power output, with $$k_{hybrid}^{rise} = \frac{P_{wp}^{rated} \times r_{obj}^T}{T}, \text{ and} \tag{9}$$

$$k_{hybrid}^{drop} = -\frac{P_{wp}^{rated} \times r_{obj}^T}{T}, \tag{10}$$

wherein the $r_{obj}^T$ is an objective rate of turbulence;

computing the rate of turbulence of the wind and energy storage hybrid power $r_{hybrid}^T$ smoothed by controlling the rate of change, by using formulae of $$r_{hybrid}^T = f_{hybrid}\left(\frac{P_{hybrid}^{max} - P_{hybrid}^{min}}{P_{hybrid}^{rated}}\right), \tag{11}$$

$$P_{hybrid}^{max} = \max\{P_{hybrid}(t), P_{hybrid}(t - \Delta t), \ldots, P_{hybrid}(t - (n-1)\Delta t)\}, \tag{12}$$

$$P_{hybrid}^{min} = \min\{P_{hybrid}(t), P_{hybrid}(t - \Delta t), \ldots, P_{hybrid}(t - (n-1)\Delta t)\}, \tag{13}$$

and $$T = n\Delta t, \tag{14}$$

wherein the $P_{hybrid}^{max}$ is a maximal wind and energy storage hybrid power sampled within the observation time T, and the $P_{hybrid}^{min}$ is a minimal wind and energy storage hybrid power sampled within the observation time, wherein an objective of controlling a rate of turbulence of power using the change rage is to control the rate of turbulence of the wind and energy storage hybrid power smoothed to be less than a specified objective rate within the observation time, as shown by a formula of $$r_{hybrid}^T < r_{obj}^T \tag{15},$$

wherein the $r_{obj}^T$ is the objective rate of turbulence of the wind and energy storage hybrid power within the observation time T;

computing the power of the system for energy storage as $$P_{BESS}(t) = P_{hybrid}(t) - P_{wp}(t) \tag{16};$$

and computing the SOC of the energy storage as follows, wherein for $P_{BESS}(t) > 0$, the system for energy storage is discharged, and the SOC decreases as shown in a formula of $$SOC(t) = SOC(t - \Delta t) - \frac{\Delta t |P_{BESS}(t)|}{W_{bat}}, \tag{17}$$

wherein for $P_{BESS}(t) < 0$, the system for energy storage is charged, and the SOC increases as shown in a formula of $$SOC(t) = SOC(t - \Delta t) + \frac{\Delta t |P_{BESS}(t)|}{W_{bat}}, \tag{18}$$

wherein the $W_{bat}$ is a capacity of the system for energy storage.

13. The system according to claim 9, wherein the performing initialization for training an estimation module and a management module comprises: initializing a discount factor α, a learning rate $l_a$ of the management module, a learning rate $l_c$ of the estimation module, a weight $W_a$ of the management module, a weight $W_c$ of the estimation module, a maximal number of cycles, and an expected error of module training, by setting an initial weight as a random number within (−1, +1), and selecting and adjusting the learning rates and the discount factor according to an objective result of control.

14. The system according to claim 9, wherein the for each time point, computing and storing a control strategy, the rate of turbulence of the wind and energy storage hybrid power smoothed, power of energy storage, and the SOC of the system for energy storage comprises steps of:
- determining whether the rate of turbulence of the wind and energy storage hybrid power $r_{hybrid}^T$ meets $r_{lim}^T \leq r_{hybrid}^T < r_{obj}^T$; in response to determining that it does, taking, by the system for energy storage, no action to correct the power of energy storage; otherwise in response to determining that it does not, performing a next step of ADP module training in seeking an optimal correction to the power of energy storage;
- training the estimation module by inputting the control strategy and a state of the controlled object to the estimation module, updating the weight of the estimation module, and outputting a cost function;
- training the management module by inputting, to the management module, the state of the controlled object comprising the rate of turbulence of the wind and energy storage hybrid power $r_{hybrid}^T$ and the power of energy storage $P_{BESS}(t)$, updating the weight of the management module, and outputting the control strategy as a correction $\Delta P_{BESS}(t)$ to the power of energy storage; and
- storing the control strategy for the each time point, computing the state of the controlled object for a next time point t=t+1 and repeating the steps until control ends.

15. The system according to claim 14, wherein the determining whether the rate of turbulence of the wind and energy storage hybrid power $r_{hybrid}^T$ meets $r_{lim}^T \leq r_{hybrid}^T < r_{obj}^T$ comprises:
- in response to determining that $0 < r_{hybrid}^T < r_{lim}^T$, determining that the system for energy storage has been outputting too much power and needs reverse correction of $$P_{BESS}^{ADP}(t) = P_{BESS}(t) + \Delta P_{BESS}(t) \tag{22}$$

wherein the $\Delta P_{BESS}(t)$ is the correction to the power of energy storage; and
- in response to determining that $r_{lim}^T \leq r_{hybrid}^T < r_{obj}^T$, determining that the system for energy storage has been outputting proper power and needs no correction, i.e., $$P_{BESS}^{ADP}(t) = P_{BESS}(t) \tag{23},$$

wherein the $P_{BESS}^{ADP}(t)$ is the power of the system for energy storage acquired by ADP of the power of energy storage by controlling the rate of change.

16. A method for Adaptive Dynamic Programming (ADP) control by a power station for large-scale energy storage, comprising:
- for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;
- determining whether the $r_{hybrid}^T$, the $P_{BESS}(t)$, and the SOC are within constraint ranges corresponding to an objective control parameter;
- in response to determining that they are not within the constraint ranges, inputting the $r_{hybrid}^T$ to the management module for the present time point;
- for the present time point, outputting, by the management module according to the $r_{hybrid}^T$, a control strategy for controlling charging power and discharging power of the system for energy storage of the power station for large-scale energy storage;
- inputting the $r_{hybrid}^T$ and the control strategy for the present time point to the estimation module for the present time point;
- outputting, by the estimation module, a cost function according to the $r_{hybrid}^T$ and the control strategy for the present time point;
- building, according to the $r_{hybrid}^T$ and the cost function, an objective function for training the estimation module;
- training the estimation module according to the objective function to minimize the objective function; and
- training the management module according to the cost function to minimize the cost function, wherein the estimation module and the management module are retrained for outputting the control strategy for a next time point.

17. The method according to claim 16, wherein the control strategy comprises a correction to power of energy storage.

18. A non-transitory computer-readable storage medium having stored therein instructions executable by a computer to perform a method for Adaptive Dynamic Programming (ADP) control by a power station for large-scale energy storage, the method comprising:
- setting an objective control parameter and a structure of a system for ADP control;
- performing parameter initialization, and importing an initialized parameter as an initial state of a controlled object;
- for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;
- performing initialization for training an estimation module and a management module;
- for each time point, computing and storing a control strategy, the rate of turbulence of the wind and energy storage hybrid power smoothed, power of energy storage, and the SOC of the system for energy storage; and
- outputting the rate of turbulence of the wind and energy storage hybrid power smoothed, the power of energy storage, the SOC of the system for energy storage, and the control strategy for the each time point, wherein the system for ADP control comprises a two-layer structure of the estimation module and the management module,
wherein each of the estimation module and the management module is built with a three-layer structure of a neural network,
wherein the objective control parameter comprises a capacity of wind power generation $P_{wp}^{rated}$, a capacity $W_{bat}$ of the system for energy storage, a limiting range of the SOC of the system for energy storage, a sampling interval $\Delta t$, an observation time T, an objective rate of turbulence $r_{obj}^T$, and a limiting rate of turbulence $r_{lim}^T$.

19. A non-transitory computer-readable storage medium having stored therein instructions executable by a computer to perform a method for Adaptive Dynamic Programming (ADP) control by a power station for large-scale energy storage, the method comprising:
- for a present time point t, computing a rate of turbulence of raw wind power $r_{wp}^T$, smoothing the raw wind power by controlling a rate of change, and computing a rate of turbulence of wind and energy storage hybrid power $r_{hybrid}^T$ smoothed, power $P_{BESS}(t)$ of a system for energy storage, and a State Of Charge (SOC) of the system for energy storage;

determining whether the $r_{hybrid}^T$, $P_{BESS}(t)$, and the SOC are within constraint ranges corresponding to an objective control parameter;

in response to determining that they are not within the constraint ranges, inputting the $r_{hybrid}^T$ to the management module for the present time point;

for the present time point, outputting, by the management module according to the $r_{hybrid}^T$, a control strategy for controlling charging power and discharging power of the system for energy storage of the power station for large-scale energy storage;

inputting the $r_{hybrid}^T$ and the control strategy for the present time point to the estimation module for the present time point;

outputting, by the estimation module, a cost function according to the $r_{hybrid}^T$ and the control strategy for the present time point;

building, according to the $r_{hybrid}^T$ and the cost function, an objective function for training the estimation module;

training the estimation module according to the objective function to minimize the objective function; and training the management module according to the cost function to minimize the cost function, wherein the estimation module and the management module are retrained for outputting the control strategy for a next time point.

* * * * *